Nov. 11, 1958  F. B. STONE  2,860,231
FLASH WELDING MACHINE
Filed March 8, 1956  4 Sheets-Sheet 1

INVENTOR.
FLOYD B. STONE
BY
Mellin and Hanscom
ATTORNEYS

INVENTOR.
FLOYD B. STONE
BY
Mellin and Hanscom
ATTORNEYS

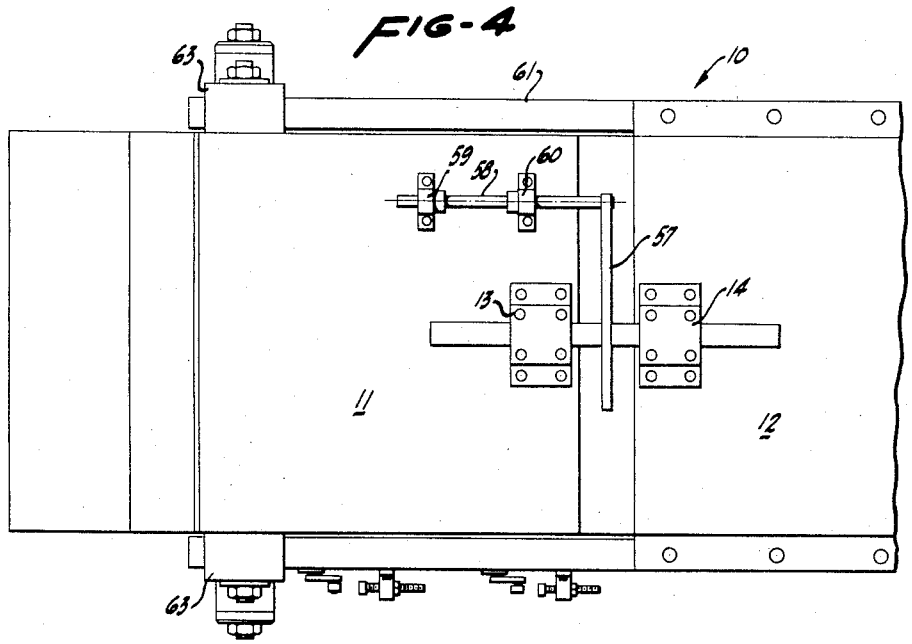
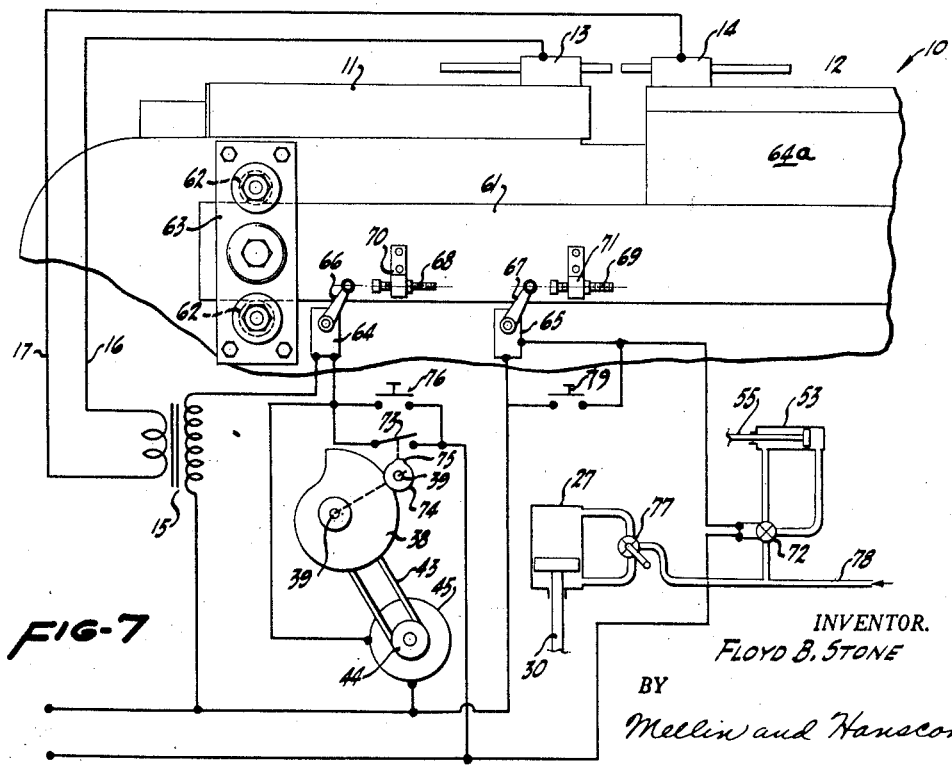

INVENTOR.
FLOYD B. STONE
BY
Mellin and Hanscom
ATTORNEYS

United States Patent Office 2,860,231
Patented Nov. 11, 1958

2,860,231

FLASH WELDING MACHINE

Floyd B. Stone, San Anselmo, Calif.

Application March 8, 1956, Serial No. 570,231

6 Claims. (Cl. 219—97)

This application relates to an automatic welding machine. More particularly, the invention relates to a welding machine of the type known as a resistance welding, or flash welding machine.

In this type of welding, the parts to be joined are pressed together and a large current is passed through the joint until the joint reaches welding temperature. The current is then stopped, and further pressure is applied to upset the joint and complete the weld.

It is the principal object of this invention to provide a machine of the type specified wherein the travel of the movable jaw is automatically accelerated after a predetermined length of travel to upset the joint and complete the weld substantially simultaneously with the cutting off of the welding current.

Another object is to provide a machine according to the previous object wherein the length of travel prior to the acceleration is adjustable.

A further object is to provide a machine according to the previous objects wherein the moving jaw is constantly urged toward the stationary jaw and wherein the initial rate of travel is controlled by a cam follower riding on the edge of a spiral plate cam and wherein the acceleration is accomplished by moving the cam follower off the cam surface.

Still another object is to provide a machine according to the previous object wherein the cam follower may be moved off said cam and said acceleration brought about at any time during the cycle at the desire of the operator.

A preferred form of the invention is described in the following detailed specification, and illustrated by way of example in the accompanying drawings, wherein:

Fig. 4 is a fragmentary plan view showing the work clamping jaws and a gauge used for setting up certain types of work in the jaws.

Fig. 7 is a fragmentary view of the front of the machine and schematically indicates the electrical and pneumatic circuits in the machine.

Figure 1:
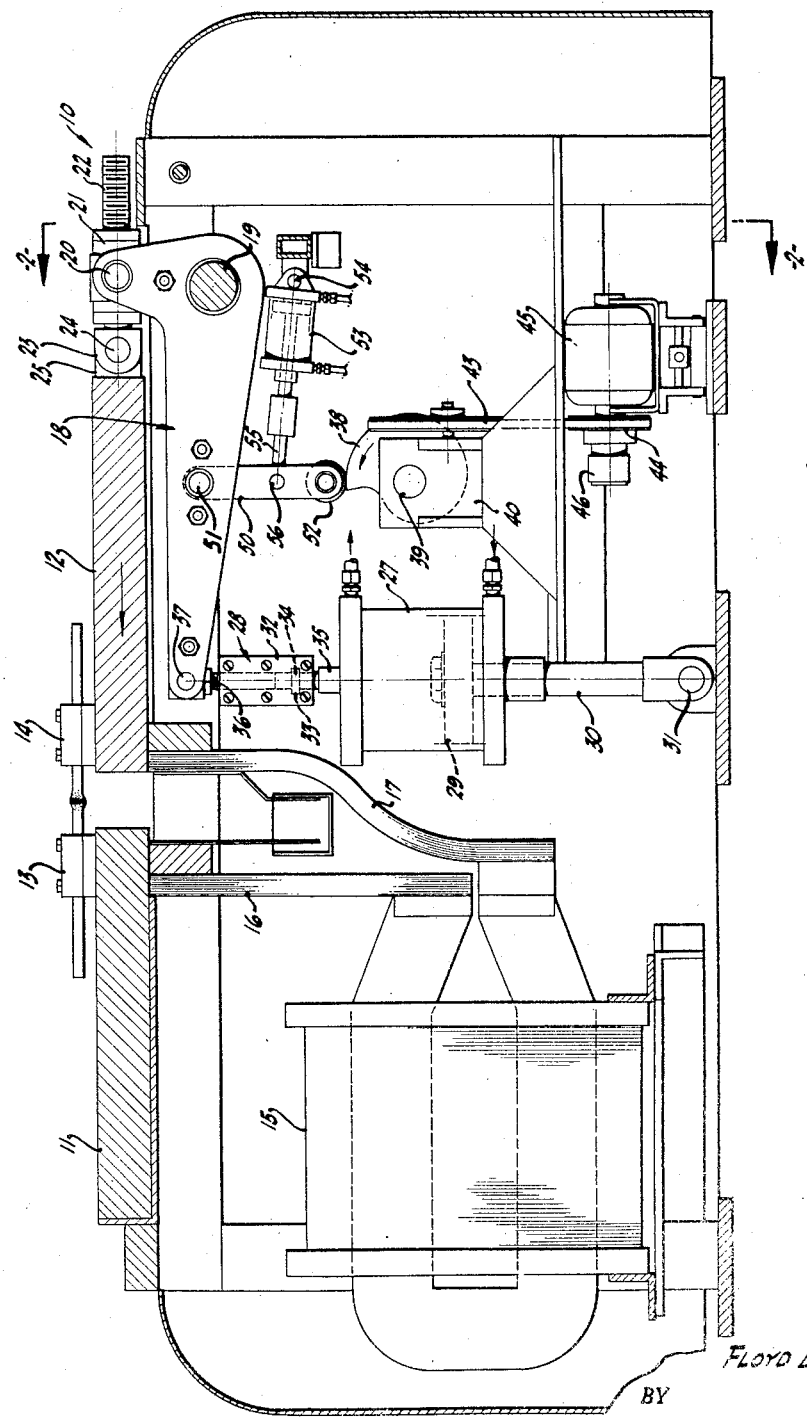
Fig. 1 is a sectional view of the machine showing the principal operating parts of the machine and their relationship to each other.
Figure 2:
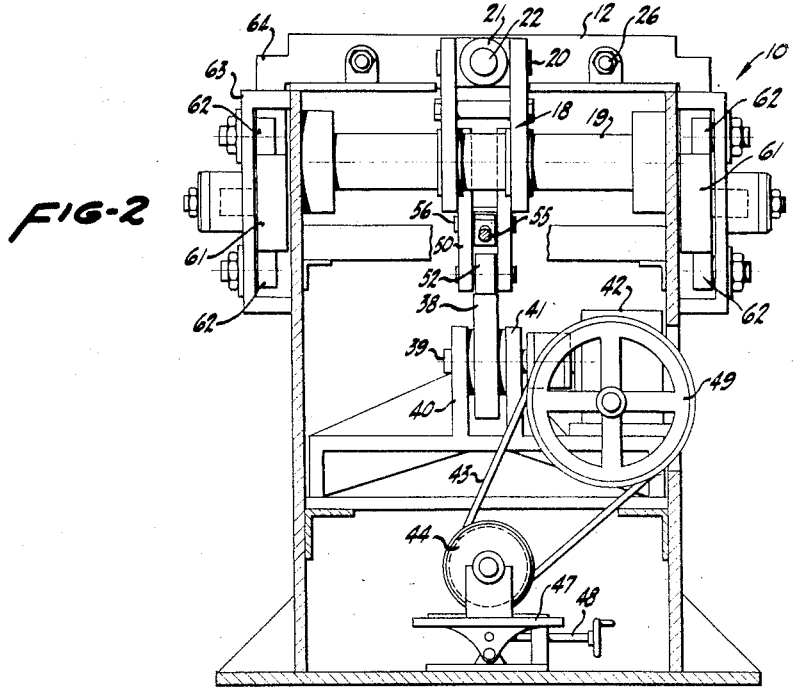
Fig. 2 is a sectional view taken on line 2—2 of Fig. 1.

Referring now to the drawings, wherein similar reference numerals are used to designate the same elements throughout the various views shown, the machine, generally indicated at 10, comprises a fixed platen 11 and a movable platen 12 having work holding clamps 13 and 14, respectively, fixed thereto. The clamps 13 and 14 are suitably insulated from the platens 11 and 12 (in a manner not shown) and are electrically connected to the opposite sides of the low voltage winding of a transformer 15 by two conductors 16 and 17.

Figure 3:
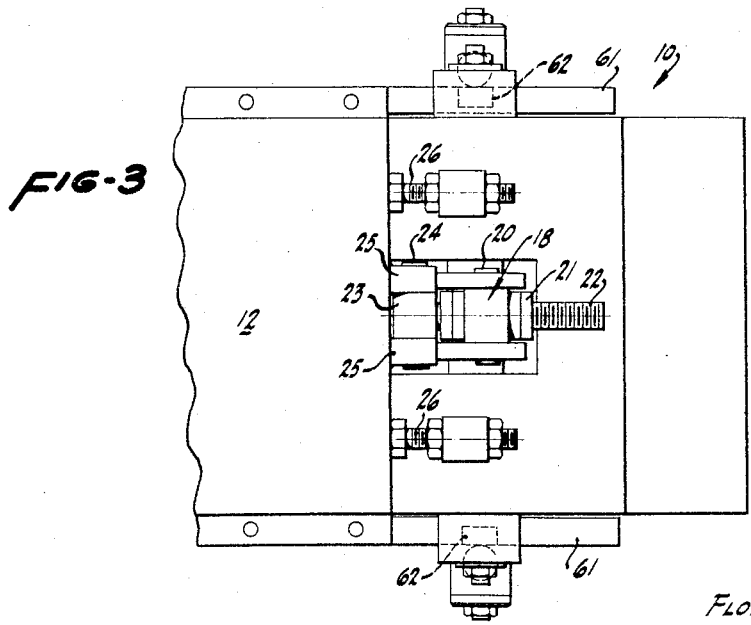
Fig. 3 is a fragmentary plan view showing the connection between the movable platen and the operating arm therefor.

The mechanism for moving the movable platen 12 comprises a bell crank assembly 18 rotatably mounted on a shaft 19 mounted in the frame of the machine. One end of the bell crank assembly 18 is pivotally connected by a pin 20 to an internally threaded nut assembly 21. A bolt 22 is threadedly received within the nut assembly 21 and one end 24 thereof is connected by a pin 24 between two rearwardly extending lugs 25 on the platen 12. A pair of adjustable stop members 26 are adjustably fixed to the frame of the machine and are adapted to be contacted by the edge of the platen 12 to limit the outward movement thereof in the manner shown in Fig. 3.

The other end of the bell crank assembly 18 is connected to a pneumatic cylinder 27 through an adjustable length linkage generally indicated at 28. The piston 29 within the power cylinder 27 is connected to a piston rod 30 which, in turn, is pivotally connected to the frame of the machine 10 as indicated at 31. The adjustable connector 28 comprises a split nut 32 having a groove 33 embracing an enlarged head 34 on a stub shaft 35 fixed to the power cylinder 27. A threaded bolt 36 is adapted to be adjustably received within the split nut 32 with its opposite end pivotally attached to the bell crank assembly 18 by a pin 37.

A plate cam 38 is fixed to a shaft 39 mounted for rotation between two brackets 40 and 41 fixed to the frame of the machine 10. The shaft 39 is driven through a suitable gear reducing unit 42 by a belt drive 43 extending from a variable diameter pulley 44 on a suitable motor 45. The outer flange of the pulley 44 is movable laterally relative to the inner flange to change the effective diameter thereof. A spring assembly, generally indicated at 46, normally urges the flanges together. The motor 45 is mounted on a tiltable table 47 and a handwheel and threaded shaft assembly 48 is provided to tilt the table to increase or decrease the distance between the motor shaft and the pulley 49 on the gear unit 42 and thereby change the speed ratio of the belt drive to vary the speed of the cam 38.

Figure 5:
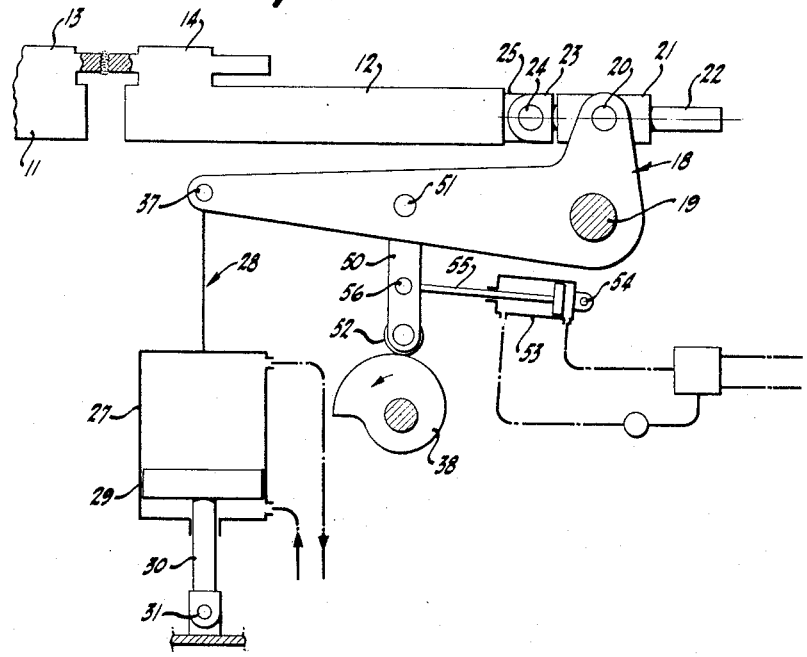
Figs. 5 and 6 are schematic views illustrating the relationship of parts just prior to and just after the upsetting acceleration of the movable jaw.

A downwardly depending cam follower 50 is pivotally attached to the bell crank assembly 18 by a pin 51 approximately halfway between the pin 37 and the shaft 19. The cam follower 50 carries a rotatable roller 52 on its lower end adapted to ride on the cam surface of the cam 38. A trip cylinder 53 is pivotally mounted at one of its ends to the frame of the machine 10 by a pivot pin 54. An adjustable piston rod 55 extends out of the opposite end of the cylinder 53 and is pivotally attached to the cam follower 50 intermediate its ends by a pin 56. The trip cylinder 53 is adapted to move the cam follower 50 to move the roller 52 from its cam-contacting position illustrated in Fig. 5 to a cam-clearing position illustrated in Fig. 6 for purposes which will hereinafter be described.

As shown in Fig. 4, a gauge 57 is provided to facilitate setting up of the work in the machine 10 when extremely close tolerances of the finished weld are required. The gauge 57 is fixed to one end of a shaft 58 rotatably mounted in two bearing members 59 and 60 fixed to the upper surface of the stationary platen 11. As can be seen in Fig. 4, the gauge 57 is adapted to be placed between the edges of the work, and the work butted thereagainst while the clamps 13 and 14 are tightened. The gauge is then rotated about the axis of the shaft 58 to an inoperative position. The adjustable connector 28 is adjusted so that when the power is reversed in the cylinder 27 to urge the bell crank assembly counterclockwise, the roller 52 will contact the cam 38 at the same time as the previously gauged ends of the work touch each other.

Referring now to Fig. 7, a horizontal slide bar 61 is mounted for longitudinal reciprocating movement by a pair of rollers 62, each rotatably connected to a bracket 63 fixed to the frame of the machine 10. A similar arrangement (not shown) supports the other end of the bar 61. The bar 61 is connected to the movable platen 12 for movement therewith by a connecting member 64a. A pair of microswitches 64 and 65 are mounted on the front face of the machine and are provided with actuating levers 66 and 67, respectively, extending upwardly adjacent the front face of the slide bar 61. A pair of switch operators 68 and 69 are adjustably mounted in suitable brackets 70 and 71, respectively, on the front face of the slide bar 61 in line with the upper ends of the actuating levers 66 and 67. The switch 65 is a normally open switch adapted to control the operation of a solenoid operated valve 72 controlling the admission of air pressure to one end or the other of the trip cylinder 53. The switch 64 is a normally closed switch and is inserted in the circuit on the line side of the transformer 15.

A cam controlled master switch 73 is inserted between the line voltage and both the normally closed microswitch 64 and the motor 45 whereby when switch 73 is opened, both the motor 45 and the transformer 15 are dead and there is no current flowing in the machine. The switch 73 is controlled by a cam 74 mounted on the same shaft 39 as the plate cam 38 for rotation therewith. The actuating lobe 75 on the cam 74 is located so that the switch 73 opens to stop the motor when the cam 38 reaches its initial position illustrated in Figs. 1 and 7. A push-button starting switch 76 is wired in parallel with the switch 73. A two-way hand-operated valve 77 controls the admission of air to the opposite ends of the main operating cylinder 27. Air under pressure is supplied from a suitable supply (not shown) to the valves 72 and 77 through a conduit 78.

A manual push-button type switch 79 is wired in parallel with the microswitch 65 controlling the actuation of the trip cylinder 53 whereby the operator can manually initiate the upsetting portion of the machine cycle at any time by actuating the push-button switch 79.

In the operation of the machine, the valve 77 is actuated to apply air pressure to the upper end of the cylinder 27 to rotate the bell crank clockwise and move the platen 12 all the way to the right against the stops 26. The work is inserted against either side of the gauge 57 and the clamps 13 and 14 are tightened. The gauge 57 is then rotated out of the way and the valve 77 is reversed to apply pressure to the lower end of the cylinder 27 to rotate the bell crank 18 counterclockwise until the roller 52 contacts the cam 38 in the manner shown in Fig. 1. At this point the ends of the work have moved into touching engagement.

The push-button switch 76 is next operated to close the circuit to the motor 45 and to the transformer 15 to initiate the machine cycle. As soon as the lobe 75 releases the switch 73, the push-button 76 may be released and the machine will automatically continue until the cycle is finished. The welding current flowing through the joint heats the joint to welding temperature. As the material is burned away from the abutting ends of the work, the platen 12 is moved toward the platen 11 by the cylinder 27 under control of the plate cam 38 to maintain the touching engagement of the edges. (The rate of this advance is adjustable by means of the variable diameter pulley 44.)

Figure 6:
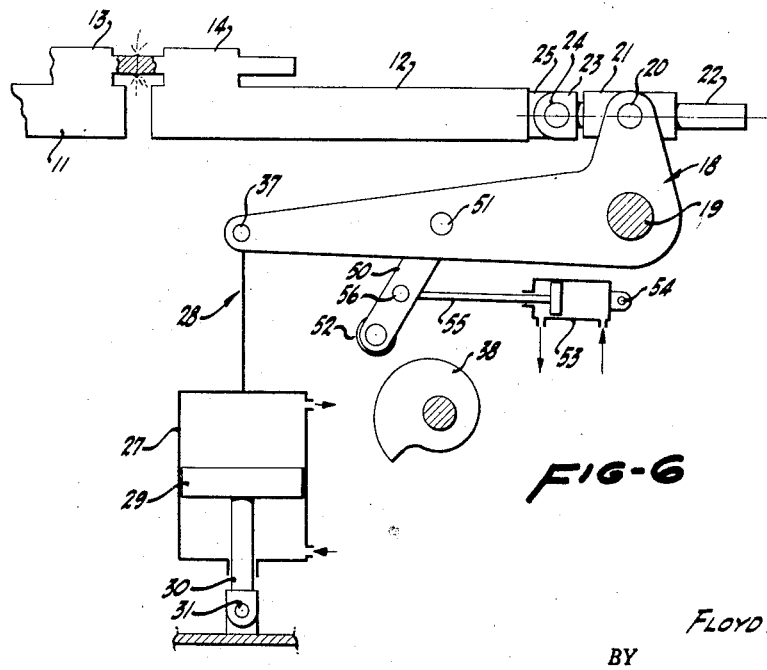

When the edges of the work reach the correct welding temperature, the switch operators 68 and 69 actuate the switches 64 and 65 to simultaneously cut off the welding current and actuate the trip cylinder 53 to move the cam follower 50 and the roller 52 to the position shown in Fig. 6 and permit the power cylinder 27 to accelerate the platen 12 to upset the ends of the work and complete the weld. The motor 45 will continue to rotate until the cam 74 opens the switch 73 when the cam 38 again reaches its initial position. After the work has been removed, it is merely necessary to reverse the hand valve 77 to apply pressure to the upper end of cylinder 27 to recondition the machine for the next cycle.

From the foregoing description it may be seen that I have provided an efficient flash welding machine wherein the initial rate of advance of the movable platen and the point at which upsetting will taken place are each individually adjustable to enable the machine to perform automatic welding of parts covering a wide range of sizes, thicknesses and materials.

While I have shown and described the preferred form of the invention, it is obvious that various changes may be made in its construction by those skilled in the art without departing from the spirit of the invention as defined in the appended claims.

What is claimed is:

1. In a flash welding machine, a stationary clamp, a movable clamp movable toward and away from said stationary clamp, means for supplying welding current to said clamps, power means for moving said movable clamp, a cam follower operatively connected to said movable clamp, cam means adapted to be contacted by said cam follower to oppose the movement of said movable clamp by said power means towards said stationary clamp and to initially control the movement of said movable clamp by said power means, trip means for moving said cam follower out of line with said cam to permit said power to accelerate said movable clamp to complete the weld, and means adjustably connected to said movable clamp for actuating said trip means after a predetermined length of travel of said movable clamp.

2. In a flash welding machine, a stationary clamp, a movable clamp movable toward and away from said stationary clamp, means for supplying welding current to said clamps, pneumatic power means for moving said movable clamp, a cam follower operatively connected to said movable clamp, a cam adapted to be contacted by said cam follower to oppose the movement of said movable clamp by said power means towards said stationary clamp and to initially control the movement of said movable clamp by said power means, trip means connected to said cam follower for moving said cam follower out of line with said cam to permit said power to accelerate said movable clamp to complete the weld, means adjustably connected to said movable clamp for actuating said trip means after a predetermined length of travel of said movable clamp, and means adjustably connected to said movable clamp for disconnecting said welding current substantially simultaneously with the actuation of said trip means.

3. In a flash welding machine, a stationary clamp, a movable clamp movable toward and away from said stationary clamp, means for supplying welding current to said clamps, pneumatic power means for moving said movable clamp, a cam follower operatively connected to said movable clamp, a spiral cam adapted to be contacted by said cam follower to oppose the movement of said movable clamp by said power means towards said stationary clamp and to initially control the movement of said movable clamp by said power means, means for rotating said spiral cam, trip means connected to said cam follower for moving said cam follower out of line with said cam to permit said power to accelerate said movable clamp to complete the weld, means adjustably connected to said movable clamp for actuating said trip means after a predetermined length of travel of said movable clamp, and means adjustably connected to said movable clamp for disconnecting said welding current substantially simultaneously with the actuation of said trip means.

4. In a flash welding machine, a stationary clamp, a movable clamp movable toward and away from said stationary clamp, means for supplying welding current to said clamps, pneumatic power means for moving said movable clamp, a cam follower operatively connected to said movable clamp, a spiral cam adapted to be contacted by said cam follower to oppose the movement of said movable clamp by said power means towards said stationary clamp and to initially control the movement of said movable clamp by said power means, means for rotating said spiral cam, means for varying the speed of rotation of said spiral cam to vary the rate of feed of said movable clamp, trip means connected to said cam follower for moving said cam follower out of line with said cam to permit said power to accelerate said movable clamp to complete the weld, means adjustably connected to said movable clamp for actuating said trip means after a predetermined length of travel of said movable clamp, and means adjustably connected to said movable clamp for disconnecting said welding current substantially simultaneously with the actuation of said trip means.

5. In a flash welding machine, a stationary clamp, a movable clamp movable toward and away from said stationary clamp, means for supplying welding current to said clamps, pneumatic power means for moving said movable clamp, a cam follower operatively connected to said movable clamp, a spiral cam adapted to be contacted by said cam follower to initially control the movement of said movable clamp by said power means, means for rotating said spiral cam, means for varying the speed of rotation of said spiral cam to vary the rate of feed of said movable clamp, a pneumatic cylinder connected to said cam followers for moving said cam follower out of line with said cam to permit said power to accelerate said movable clamp to complete the weld, a solenoid operated valve for controlling said pneumatic cylinder, means adjustably connected to said movable clamp for actuating said solenoid valve after a predetermined length of travel of said movable clamp, and means adjustably connected to said movable clamp for disconnecting said welding current substantially simultaneously with the actuation of said pneumatic cylinder.

6. In a flash welding machine, a stationary clamp, a movable clamp movable toward and away from said stationary clamp, means for supplying welding current to said clamps, a microswitch in the circuit of said means, pneumatic power means for moving said movable clamp, a cam follower operatively connected to said movable clamp, a spiral cam adapted to be contacted by said cam follower to initially control the movement of said movable clamp by said power means, means for rotating said spiral cam, means for varying the speed of rotation of said spiral cam to vary the rate of feed of said movable clamp, a pneumatic cylinder connected to said cam follower for moving said cam follower out of line with said cam to permit said power to accelerate said movable clamp to complete the weld, a solenoid operated valve for controlling said pneumatic cylinder, means adjustably connected to said movable clamp for actuating said solenoid valve after a predetermined length of travel of said movable clamp, and means adjustably connected to said movable clamp for actuating said microswitch to disconnect said welding current substantially simultaneously with the actuation of said pneumatic cylinder.

References Cited in the file of this patent

UNITED STATES PATENTS

| | | |
|---|---|---|
| 2,002,007 | Hanson | May 21, 1935 |
| 2,665,360 | Hansen | Jan. 5, 1954 |

FOREIGN PATENTS

| | | |
|---|---|---|
| 692,779 | Germany | June 26, 1940 |